United States Patent
Malik et al.

(10) Patent No.: US 6,886,929 B2
(45) Date of Patent: May 3, 2005

(54) TECHNIQUES FOR IMPROVING PRESSURE SENSOR SHOCK ROBUSTNESS IN FLUID CONTAINMENT DEVICES

(75) Inventors: Craig Malik, Corvallis, OR (US);
Michael S. Ardito, Lebanon, OR (US);
Philip Burkum, Corvallis, OR (US);
Rhonda L. Wilson, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 76 days.

(21) Appl. No.: 10/280,441

(22) Filed: Oct. 25, 2002

(65) Prior Publication Data

US 2004/0080552 A1 Apr. 29, 2004

(51) Int. Cl.[7] .......................... B41J 2/175; H01C 10/10; G01L 7/00; G01L 9/02
(52) U.S. Cl. .............................. 347/86; 347/87; 73/706; 73/746; 338/39
(58) Field of Search .............................. 347/7, 85, 86, 347/87, 94, 95; 338/39; 73/299, 301, 706, 746

(56) References Cited

U.S. PATENT DOCUMENTS

| 4,074,284 A | 2/1978 | Dexter |
| 4,777,497 A * | 10/1988 | Nozu et al. .................. 347/68 |
| 4,884,451 A * | 12/1989 | Schulze .......................... 73/706 |
| 4,942,383 A * | 7/1990 | Lam et al. ..................... 338/42 |
| 4,967,594 A | 11/1990 | Ehrenfried |
| 5,619,022 A | 4/1997 | Long |
| 5,644,285 A | 7/1997 | Maurer |
| 6,079,266 A | 6/2000 | Wright |
| 6,164,743 A | 12/2000 | Hmelar et al. |
| 6,183,076 B1 | 2/2001 | Childers |
| 6,435,638 B1 | 8/2002 | Wilson et al. |
| 6,467,354 B1 | 10/2002 | Allen |
| 2003/0005782 A1 * | 1/2003 | McDonald et al. ......... 73/866.1 |

OTHER PUBLICATIONS

O'Keefe Controls Co., One page Data Sheet, "Pressure Snubbers", 2000.
Honeywell, Micro Switch Sensing and Control, Reference and Application Data Sheet for "Pressure Sensors", Protecting Pressure Ssensor Diaphragm From Rupture Due To Water Hammer—Note #8.

* cited by examiner

Primary Examiner—Stephen D. Meler
Assistant Examiner—Alfred Dudding

(57) ABSTRACT

Techniques are disclosed for improving pressure sensor shock robustness in fluid containment devices by providing a mechanical filter configured to prevent high-frequency pressure shocks from damaging the pressure sensor. One approach includes a body of elastomeric material disposed on an external surface of the sensor. Another approach is a porous plug in a fluid pathway leading to the sensor. Yet another approach is to provide a seal structure with a labyrinth fluid path.

56 Claims, 12 Drawing Sheets

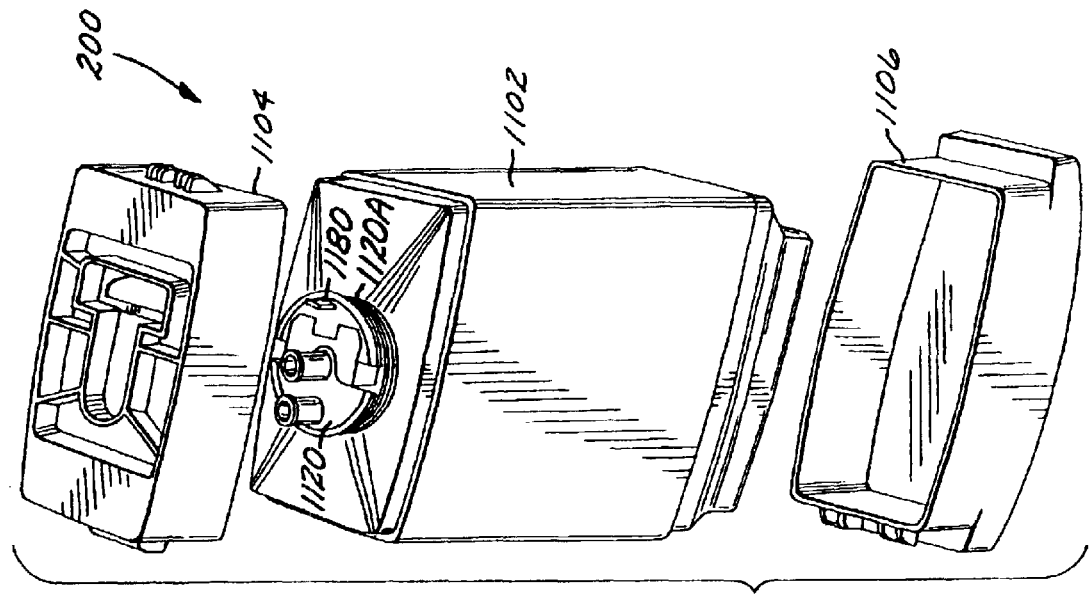
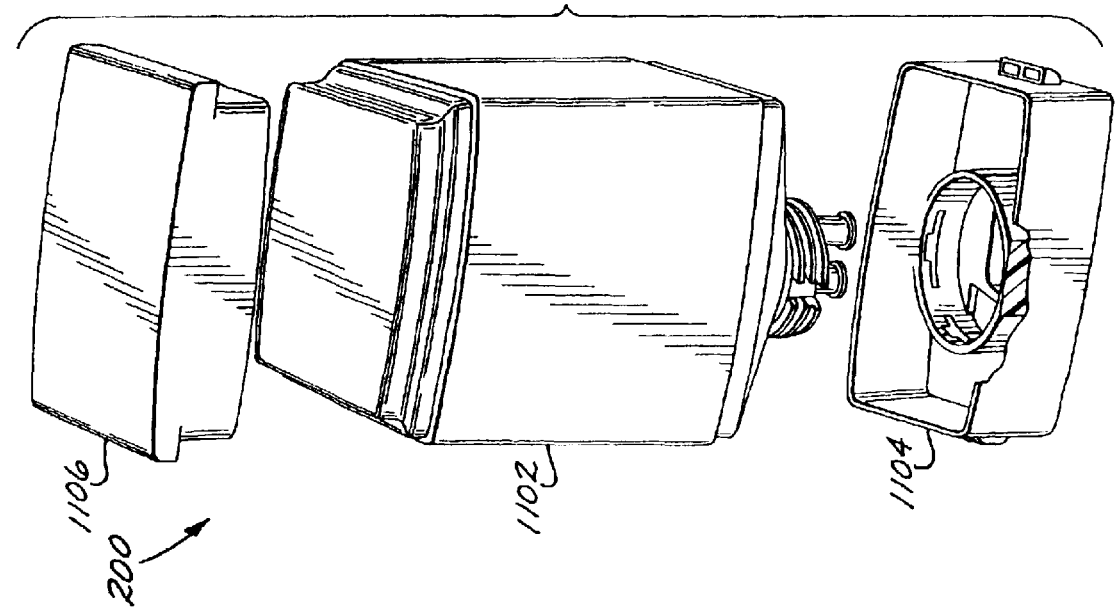
FIG. 6
FIG. 7

TECHNIQUES FOR IMPROVING PRESSURE SENSOR SHOCK ROBUSTNESS IN FLUID CONTAINMENT DEVICES

BACKGROUND OF THE DISCLOSURE

The art of inkjet printing is relatively well developed. Commercial products such as computer printers, graphics plotters, and facsimile machines have been implemented with ink jet technology for producing printed media. Generally, an ink jet image is formed pursuant to precise placement on a print medium of ink drops emitted by an ink drop generating device known as an ink jet printhead. Typically, an ink jet printhead is supported on a movable carriage that traverses over the surface of the print medium and is controlled to eject drops of ink at appropriate times pursuant to command of a microcomputer or other controller, wherein the timing of the application of the ink drops is intended to correspond to a pattern of pixels of the image being printed.

Some known printers make use of an ink container that is separably replaceable from the printhead. When the ink container is exhausted it is removed and replaced with a new ink container. The use of replaceable ink containers that are separate from the printhead allow users to replace the ink container without replacing the printhead. The printhead is then replaced at or near the end of printhead life, and not when the ink container is replaced.

A consideration with ink jet printing systems that employ ink containers that are separate from the printheads is the general inability to predict an out of ink condition for an ink container. In such ink jet printing systems, it is important that printing cease when an ink container is nearly empty with a small amount of stranded ink. Otherwise, printhead damage may occur as a result of firing without ink, and/or time is wasted in operating a printer without achieving a complete printed image, which is particularly time consuming in the printing of large images which often are printed in an unattended manner on expensive media.

Inkjet cartridges with integrated pressure sensing elements are known in the art, such as described in U.S. Pat. No. 6,435,638, INK BAG FITMENT WITH AN INTEGRATED PRESSURE SENSOR FOR LOW INK DETECTION. A purpose of the pressure sensing element is to measure changes in the pressure of the ink or fluid being delivered to the printhead over the ink cartridge lifetime, to provide data for indicating ink level and out-of-ink information.

A challenge for ink cartridges with integrated pressure sensors is protecting the sensor from pressure spikes, which commonly occur during manufacturing, shipping or handling, and can occur due to dropping the cartridge.

BRIEF DESCRIPTION OF THE DRAWING

Advantages and features of the disclosed invention will readily be appreciated by persons skilled in the art from the following detailed description when read in conjunction with the drawing wherein:

FIG. 6 is a schematic isometric exploded view illustrating exemplary major components of an implementation of one of the ink containers of the exemplary printer/plotter system of FIG. 1.

FIG. 7 is a further schematic isometric exploded view illustrating exemplary major components of an implementation of one of the ink containers of the exemplary printer/plotter system of FIG. 1.

DETAILED DESCRIPTION OF THE DISCLOSURE

Figure 1:
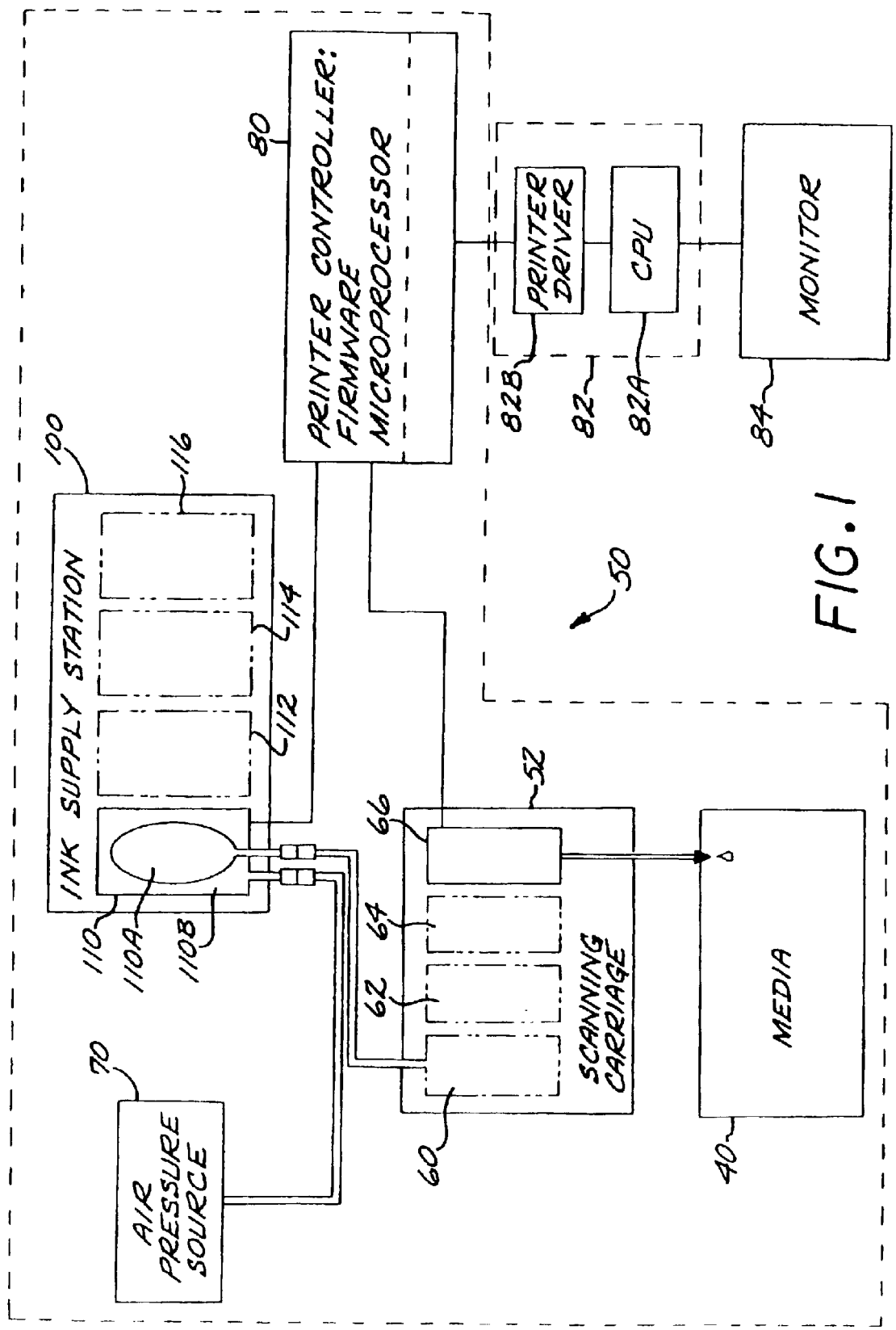
FIG. 1 is a schematic block diagram of an exemplary printer/plotter system in which an ink level sensing circuit can be employed.

In the following detailed description and in the several figures of the drawing, like elements are identified with like reference numerals.

Figure 2:
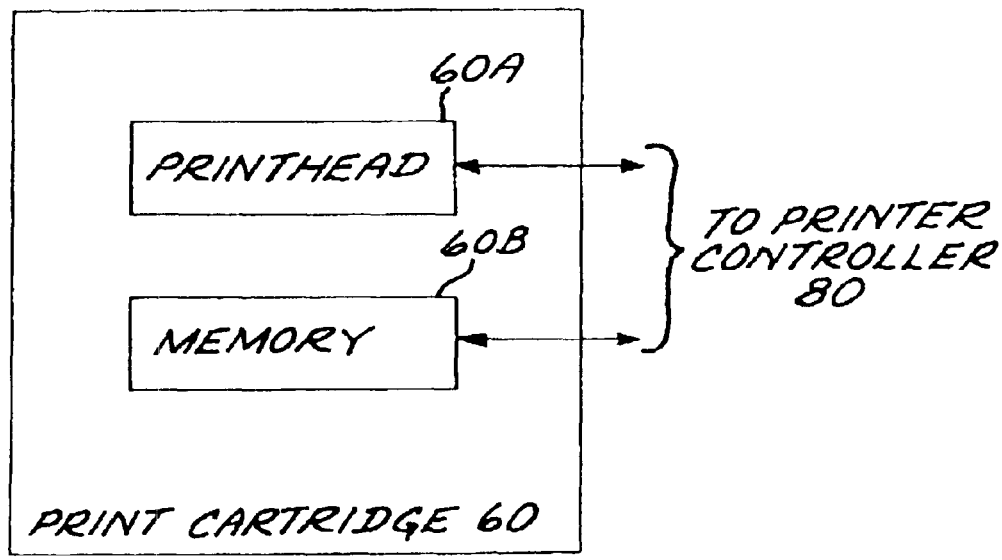
FIG. 2 is a schematic block diagram depicting exemplary major components of one of the print cartridges of the exemplary printer/plotter system of FIG. 1.

Referring now to FIG. 1, set forth therein is a schematic block diagram of an exemplary printer/plotter 50 in which the invention can be employed. A scanning print carriage 52 holds a plurality of print cartridges 60–66 which are fluidically coupled to an ink supply station 100 that supplies pressurized ink to the print cartridges 60–66. By way of illustrative example, each of the print cartridges 60–66 comprises an ink jet printhead and an integral printhead memory, as schematically depicted in FIG. 2 for the representative example of the print cartridge 60 which includes an ink jet printhead 60A and an integral printhead memory 60B. Each print cartridge has a fluidic regulator valve that opens and closes to maintain a slight negative gauge pressure in the cartridge that is optimal for printhead performance. The ink provided to each of the print cartridges 60–66 is pressurized to reduce the effects of dynamic pressure drops.

The ink supply station 100 contains receptacles or bays for accepting ink containers 110–116 which are respectively associated with and fluidically connected to respective print cartridges 60–66. Each of the ink containers 110–114 includes a collapsible ink reservoir, such as collapsible ink reservoir 110A that is surrounded by an air pressure chamber 110B. An air pressure source or pump 70 is in communication with the air pressure chamber for pressurizing the collapsible ink reservoir. For example, one pressure pump supplies pressurized air for all ink containers in the system. Pressurized ink is delivered to the print cartridges by an ink flow path that includes for example respective flexible plastic tubes connected between the ink containers 110–116 and respectively associated print cartridges 60–66.

Figure 3:
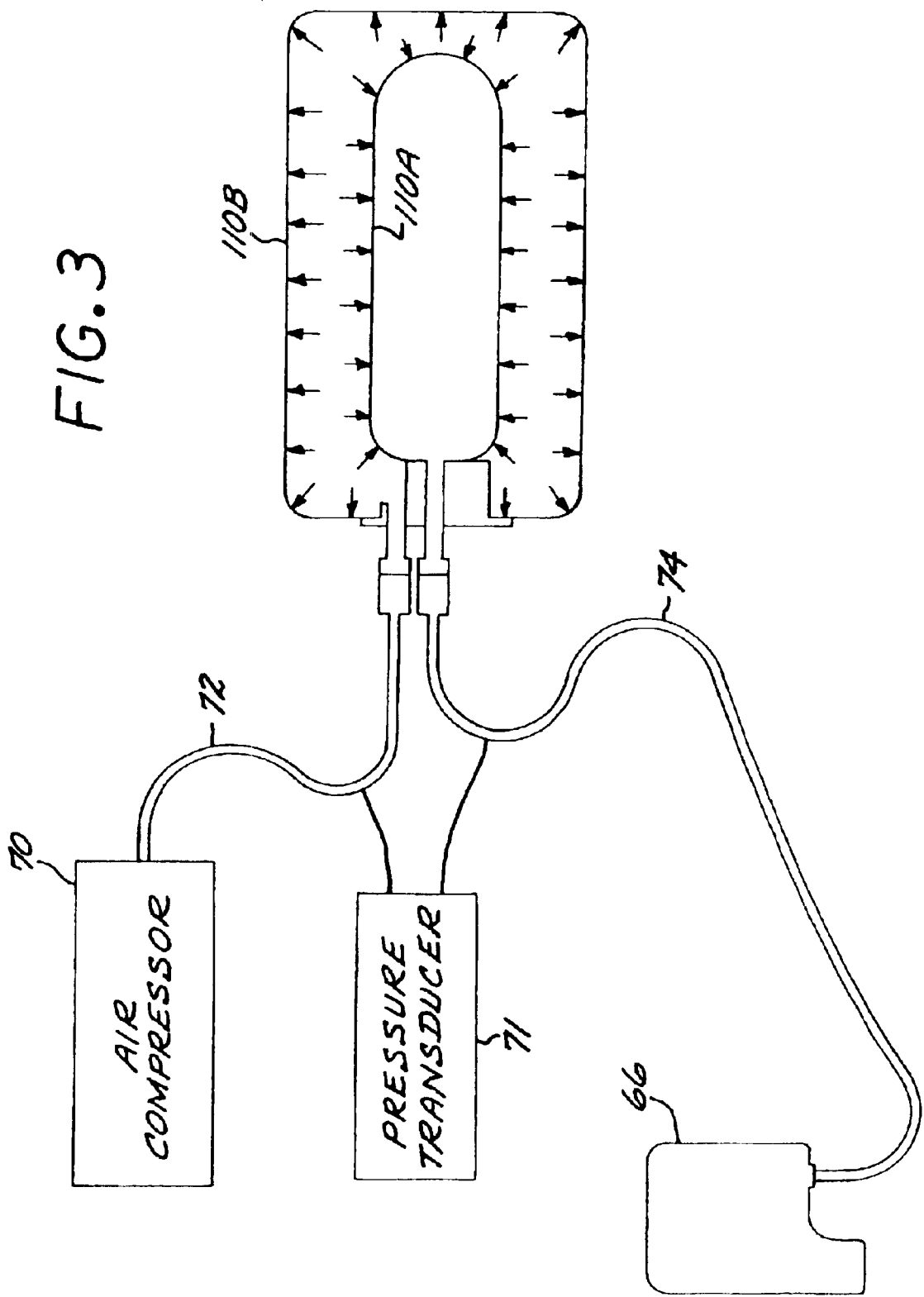
FIG. 3 is a schematic block diagram illustrating in a simplified manner an exemplary connection between an off-carriage ink container, an air pressure source, and an on-carriage print cartridge of the exemplary printer/plotter system of FIG. 1.

FIG. 3 is a simplified diagrammatic view illustrating the pressure source 70, an air pressure line 72 that delivers pressurizing gas to the pressure chamber 110B which pressurizes the collapsible ink reservoir 110a so as to cause ink to be delivered to the printhead cartridge via an ink supply line 74. A pressure transducer 71 is provided for detecting a pressure differential between air that is pressurizing the collapsible ink reservoir 110a and a pressure indicative of pressure in the collapsible ink reservoir 110a. For example, the pressure transducer 71 is in communication with the ink supply line 74 and the air pressure line 72. Alternatively, the pressure transducer 71 is disposed in the pressure chamber 110B, as illustrated in FIGS. 11–15, and senses an ink pressure in the collapsible ink reservoir 110a and a pressure in the pressure chamber 110B. As a further alternative, the pressure transducer 71 is a absolute pressure sensor that senses absolute pressure of ink in the ink supply line 74 or in the collapsible ink reservoir 110a.

Figure 4:
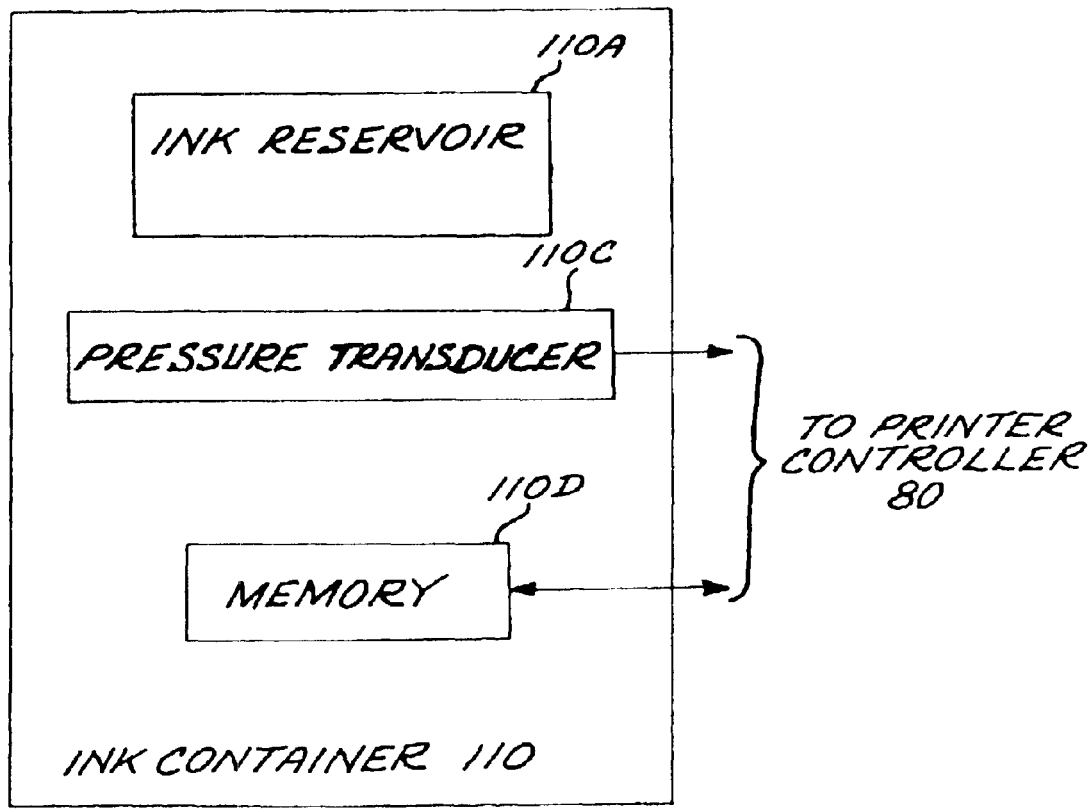
FIG. 4 is a schematic block diagram depicting exemplary major components of one of the ink containers of the exemplary printer/plotter system of FIG. 1.

Each of the ink containers includes a collapsible ink reservoir and an optional integral ink cartridge memory. Schematically depicted in FIG. 4 is a representative example of the ink container 110 that more particularly includes an ink reservoir 110A, an integral ink cartridge memory 110D, and a pressure transducer 110C.

Continuing to refer to FIG. 1, the scanning print carriage 52, the print cartridges 60–66, and the ink containers 110–114 are electrically interconnected to a printer microprocessor controller 80 that includes printer electronics and firmware for the control of various printer functions, including for example analog-to-digital converter circuitry for converting the outputs of the ink level sensing pressure transducers 71 associated with the ink containers 110–116. The controller 80 thus controls the scan carriage drive system and the printheads on the print carriage to selectively energize the printheads, to cause ink droplets to be ejected in a controlled fashion on the print medium 40. The printer controller 80 further detects a low level of remaining ink volume in each of the ink containers 110–114 pursuant to the output of the associated pressure transducer 71.

A host processor 82, which includes a CPU 82A and a software printer driver 82B, is connected to the printer controller 82. For example, the host processor 82 comprises a personal computer that is external to the printer 50. A monitor 84 is connected to the host processor 82 and is used to display various messages that are indicative of the state of the ink jet printer. Alternatively, the printer can be configured for stand-alone or networked operation wherein messages are displayed on a front panel of the printer.

Figure 5:
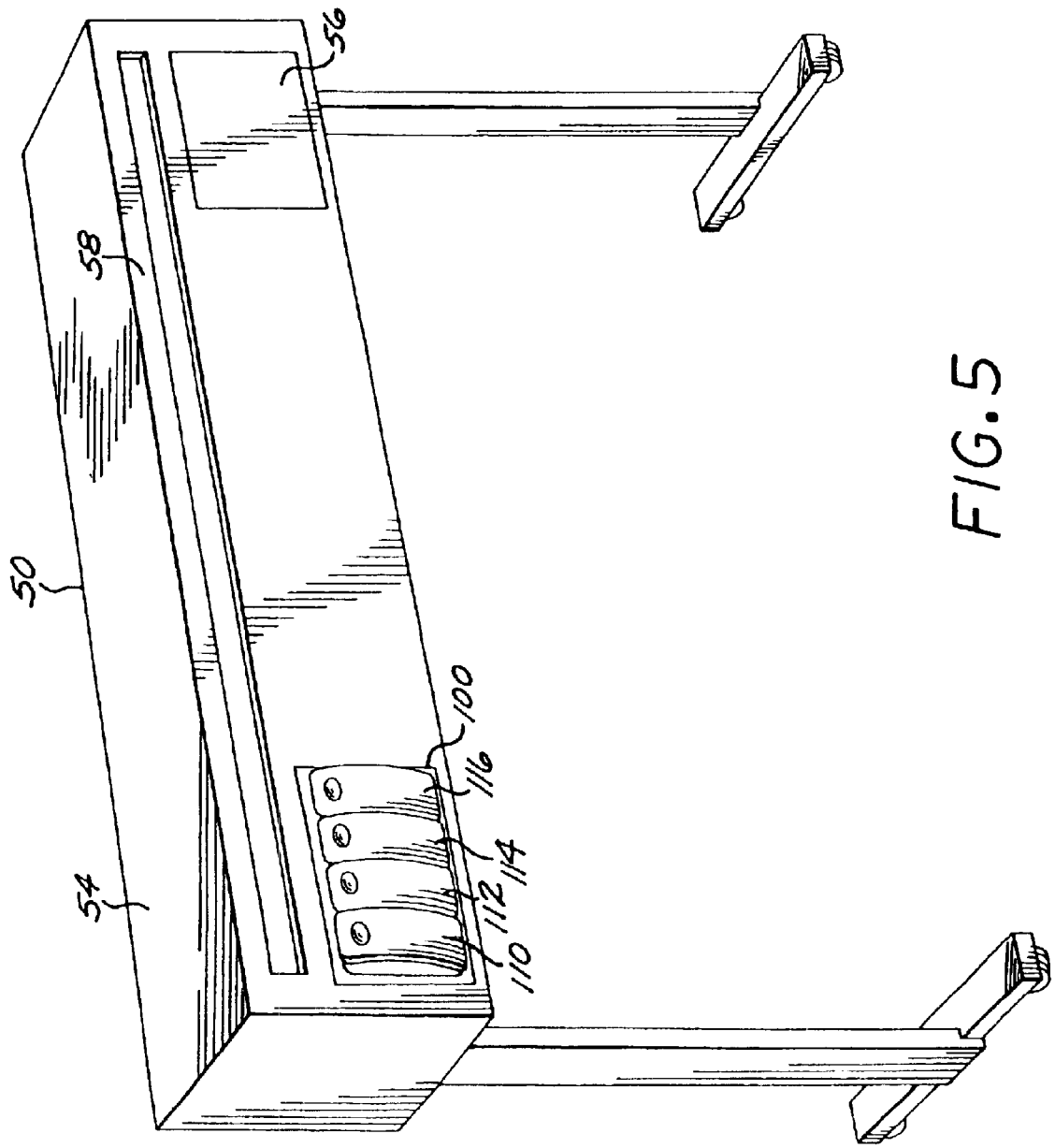
FIG. 5 is a simplified isometric view of an exemplary implementation of the exemplary printer/plotter system of FIG. 1.

FIG. 5 shows in isometric view an exemplary form of a large format printer/plotter in which the invention can be employed, wherein four off-carriage (or off-axis) ink containers 110, 112, 114, 116 are shown installed in an ink supply station. The printer/plotter of FIG. 5 further includes a housing 54, a front control panel 56 which provides user control switches, and a media output slot 58. While this exemplary printer/plotter is fed from a media roll, it should be appreciated that alternative sheet feed mechanisms can also be used.

Referring now to FIGS. 6–14, schematically illustrated therein is a specific implementation of an ink container 200, which can be implemented as each of the ink containers 110–116 that are structurally substantially identical.

As shown in FIGS. 6–7, the ink container 200 generally includes an outer container or pressure vessel 1102, a chassis member 1120 attached to a neck region 1102A at a leading end of the pressure vessel 1102, a leading end cap 1104 attached to the leading end of the pressure vessel, and a trailing end cap 1106 attached to the trailing end of the pressure vessel 1102.

Figure 8:
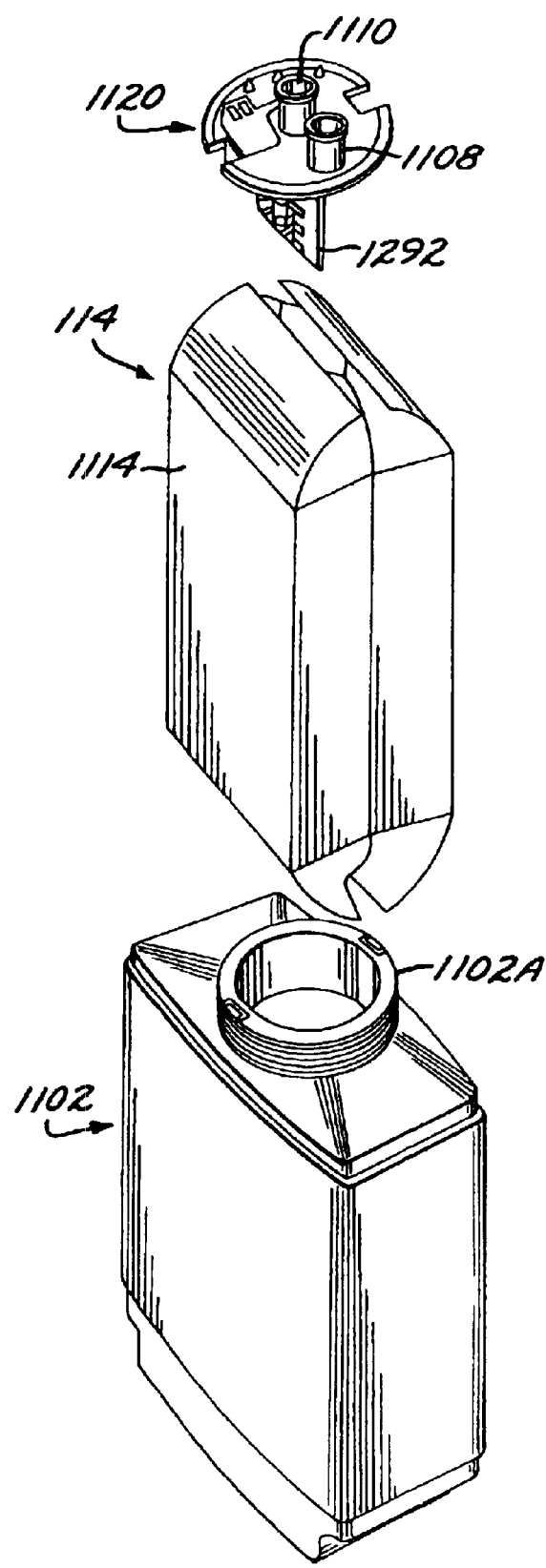
FIG. 8 is an exploded isometric view showing the pressure vessel, collapsible ink reservoir, and chassis member of the ink container of FIGS. 6 and 7.
Figure 9:
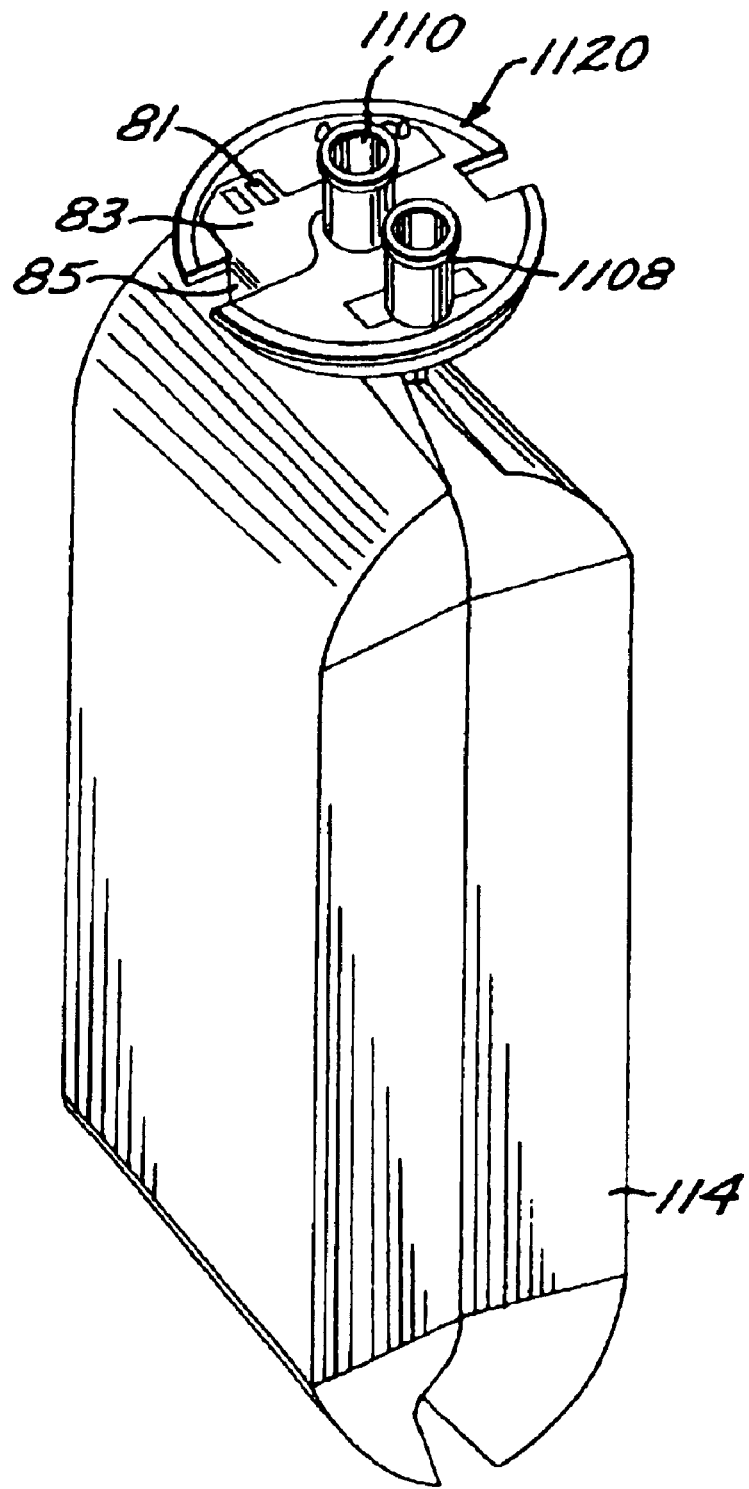
FIG. 9 is a schematic isometric view illustrating the collapsible ink reservoir and chassis member of the ink container of FIGS. 6 and 7.
Figure 10:
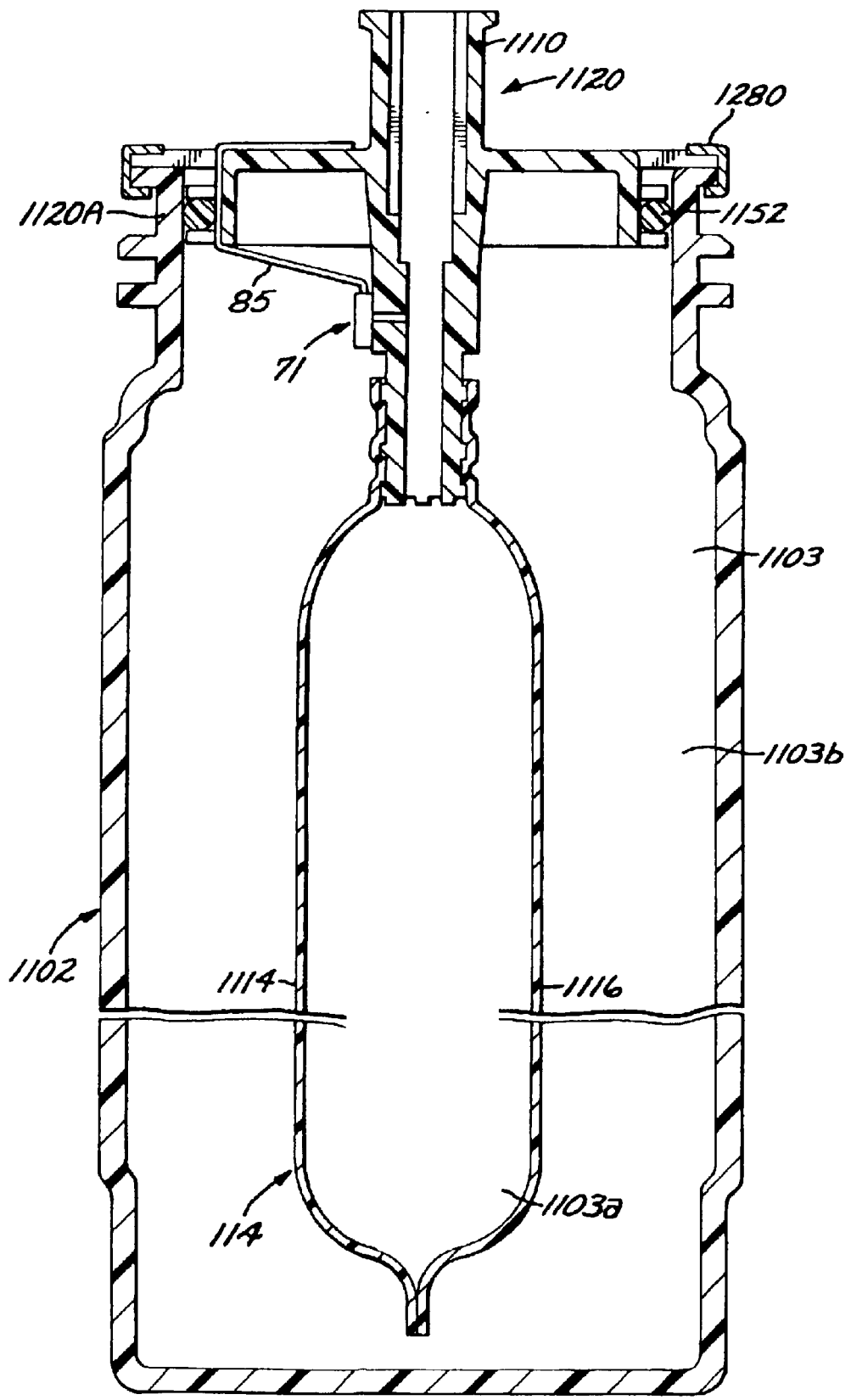
FIG. 10 is a cross-sectional view of the ink container of FIGS. 6 and 7, showing a pressure transducer disposed in the ink container.
Figure 11:
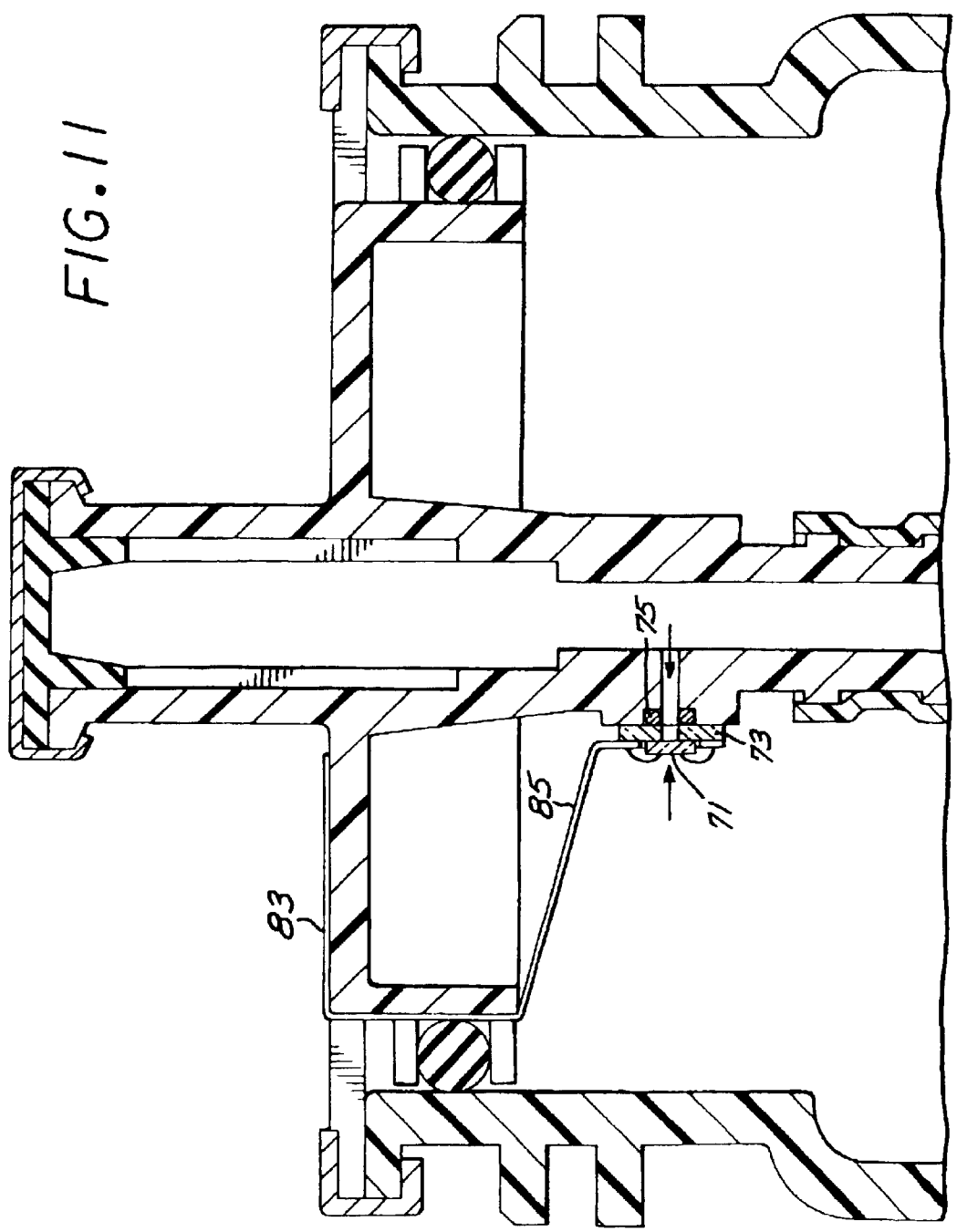
FIG. 11 is a cross sectional view illustrating the attachment of the pressure transducer to the chassis member of the ink container of FIGS. 6 and 7, and illustrating two exemplary embodiments of structures for improved the shock robustness of the pressure transducer.

As more particularly shown in FIGS. 8–10, the ink container 200 further includes a collapsible ink bag or reservoir 114 disposed in an interior chamber 1103 defined by the pressure vessel 1102 and sealingly attached to a keel portion 1292 of the chassis 1120 which seals the interior of the pressure vessel 1102 from outside atmosphere while providing for an air inlet 1108 to the interior of the pressure vessel 1102, and an ink outlet port 1110 for ink contained in the ink reservoir 114.

The chassis 1120 is secured to the opening of the neck region 1102A of the pressure vessel 1102, for example by an annular crimp ring 1280 that engages a top flange of the pressure vessel and an abutting flange of the chassis member. A pressure sealing O-ring 1152 suitably captured in a circumferential groove on the chassis 1120 engages the inside surface of the neck region 1102A of the pressure vessel 1102.

The collapsible ink reservoir 114 more particularly comprises a pleated bag having opposing walls or sides 1114, 1116. In an exemplary construction, an elongated sheet of bag material is folded such that opposed lateral edges of the sheet overlap or are brought together, forming an elongated cylinder. The lateral edges are sealed together, and pleats are in the resulting structure generally in alignment with the seal of the lateral edges. The bottom or non-feed end of the bag is formed by heat sealing the pleated structure along a seam transverse to the seal of the lateral edges. The top or feed end of the ink reservoir is formed similarly while leaving an opening for the bag to be sealingly attached to the keel portion 1292 of the chassis 1120. By way of specific example, the ink reservoir bag is sealingly attached to keel portion 1292 by heat staking.

The collapsible ink reservoir 114 thus defines an occupied portion 1103a of the interior chamber 1103, such that an unoccupied portion 1103b of the interior chamber 1103 is formed between the pressure vessel 1102 and the collapsible ink reservoir 114. The air inlet 1108 is the only flow path into or out of the unoccupied portion 1103b which functions as an air pressure chamber, and more particularly comprises a fluid conveying conduit that is in communication with the unoccupied portion 1103b of the interior chamber 1103. The ink outlet port 1110 is the only flow path into or out of the occupied portion 1103a and comprises a fluid conveying conduit that is in communication with the occupied portion 1103a of the interior chamber 1103, namely the interior of the collapsible ink reservoir 114. The ink outlet port 1110 is conveniently integrated with the keel portion 1292 of the chassis 1120.

As more specifically shown in FIGS. 10–16, a pressure transducer 71 is disposed in the interior chamber 1103 so as to detect a difference between a pressure of the unoccupied portion 1103b of the interior chamber 1103 and a pressure of ink in the collapsible ink reservoir 114 (i.e., a differential pressure), or an absolute pressure of ink in the collapsible ink reservoir 114. By way of illustrative example, the pressure transducer 71 is mounted on a ceramic substrate 73 to form a transducer subassembly that is attached to an outside wall of the output port 1110. A bore or opening in the wall of the output port 1110 and a bore or opening in the substrate 73 expose the pressure transducer to pressure in the output port 1110. Appropriate sealing including an O-ring 75 is provided to prevent leakage between the interior of the outlet port 1110 and the unoccupied portion 1103b of the interior chamber 1103. The pressure transducer 71 is very close to the ink supply in the collapsible ink reservoir 114 so as to avoid dynamic losses between the ink supply and the point of pressure measurement, and thus the pressure transducer 71 is effectively exposed to the pressure in the collapsible ink reservoir 114.

The electrical output of the pressure transducer 71 is provided to externally accessible contact pads 81 disposed on the top of the chassis 1120 via conductive leads 83 of a flexible printed circuit substrate 85 that extends between the ceramic substrate and the top of the chassis 1120, passing on the outside surface of the chassis 1120 between the O-ring 1152 and such outside surface. The conductive leads 83 are electrically connected to the externally accessible contact pads 81 disposed on the top of the chassis which can be formed on one end of the flexible printed circuit substrate 85 that would be attached to the top of the chassis 1120. The output of the pressure transducer 71 can be sampled while printing which avoids the need to interrupt printing to take a reading.

Optionally, a memory chip package 87 can be conveniently mounted on the ceramic substrate 87 and interconnected to associated externally accessible contact pads by associated conductive leads 83 of the flexible printed circuit substrate 85.

The pressure of the ink supply (for example as detected via the ink supply line) remains approximately equal to the pressure of the pressurizing gas (for example in the pressure line) for much of the ink supply life, and thus the differential pressure is approximately zero for much of the ink supply life. As the ink supply approaches an empty condition, the pressure of the ink supply decreases with decreasing remaining ink, whereby the differential pressure increases with decreasing ink. The relationship between differential pressure and the amount of ink remaining is reasonably consistent for any given system and can be reliably characterized.

A low ink level warning can optionally provided when the supply pressure decreases below a selected supply pressure threshold that is indicative of a low ink level threshold.

In an exemplary embodiment, the pressure sensor 71 is fabricated on a silicon die, which is positioned over the opening 73A formed in the substrate 73. In this exemplary embodiment, the sensor is a commercially available part, e.g. a Silicon Microstructure SM5102-005 pressure sensor, having a die size of about 2 mm by 2 mm by 0.9 mm high. In accordance with this invention, means are provided for improving the robustness of the pressure sensor 71 to high frequency pressure waves or pressure shocks, i.e. sudden spikes or increases in the pressure differential being monitored by the pressure sensor. Such pressure shocks can be the result of, for example, a full ink supply being dropped or roughly handled during manufacture, shipping or other handling.

Embodiments of the invention include mechanical filters, serving as protection structures, configured to prevent high-frequency pressure shocks from damaging the pressure sensor, while not substantially affecting static and low-frequency measurements.

Figure 12:
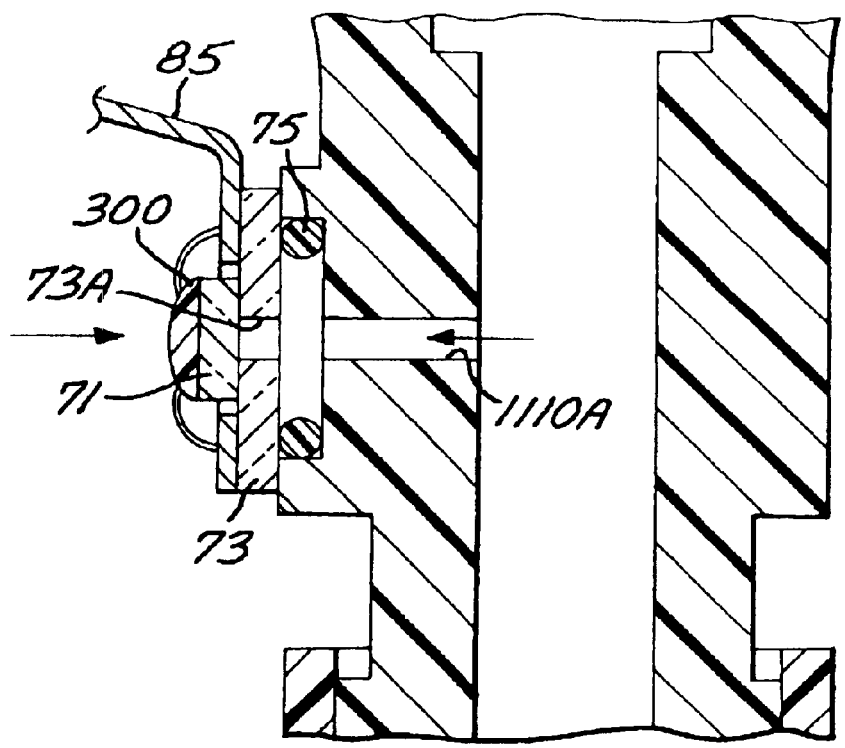
FIG. 12 is a broken-away cross-sectional view of a portion of the ink container of FIG. 10, and showing a mass of low-stiffness material on the outer surface of the transducer die.
Figure 13:
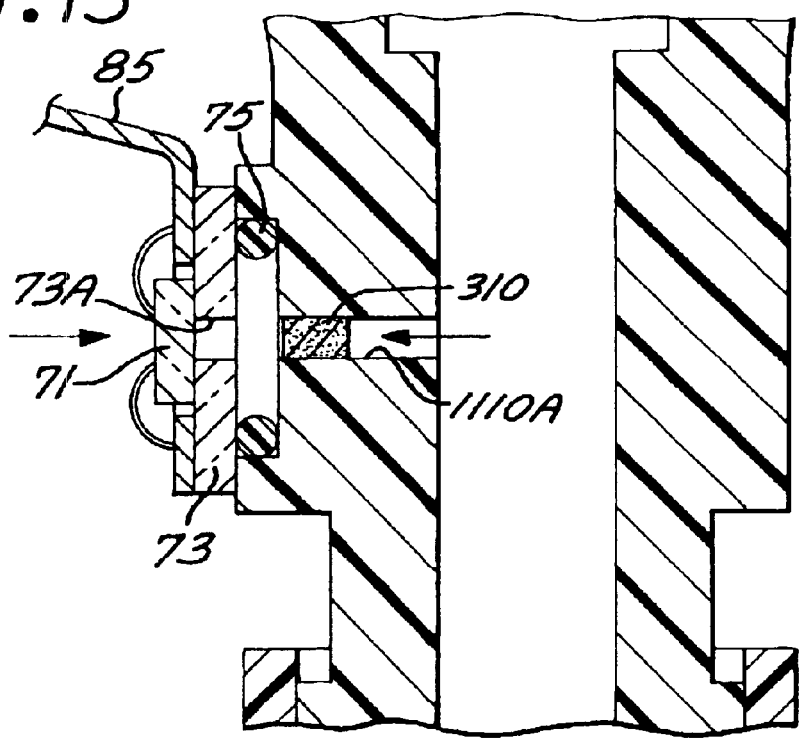
FIG. 13 is a broken-away cross-sectional view of a portion of the ink container of FIG. 10, and showing a porous plug fitted into the fluid passageway leading to the pressure transducer to dampen high-frequency shock waves.
Figure 14:
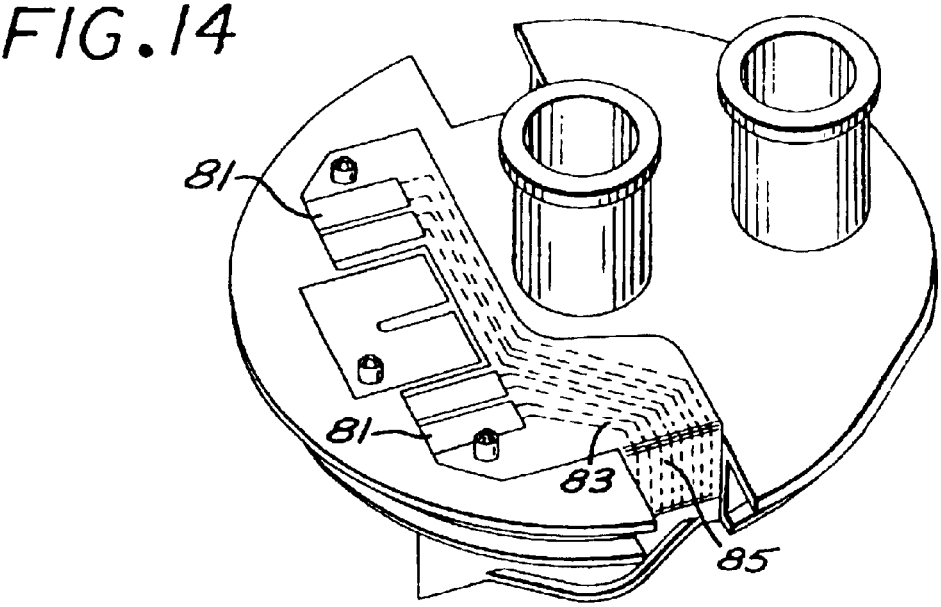
FIG. 14 is an isometric view illustrating electrical contacts disposed on the top portion of the chassis member of the ink container of FIGS. 6 and 7.
Figure 15:
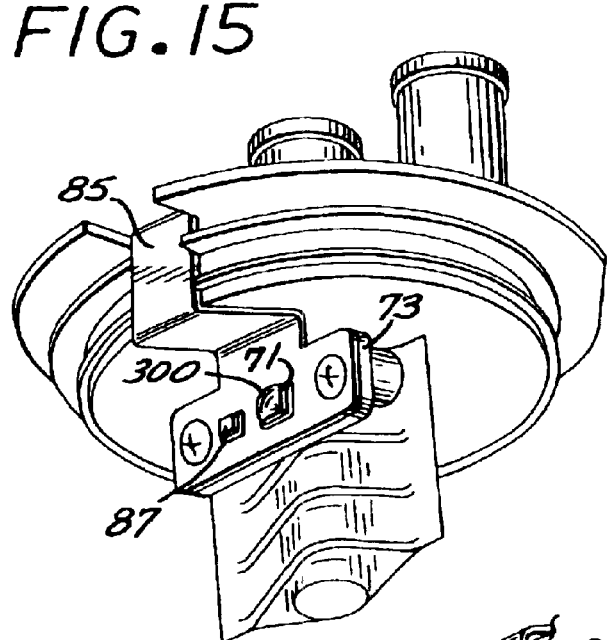
FIG. 15 is an isometric view illustrating the attachment of the pressure transducer to the chassis member of the ink container of FIGS. 6 and 7, with the mass of low-stiffness material of FIG. 12.
Figure 16:
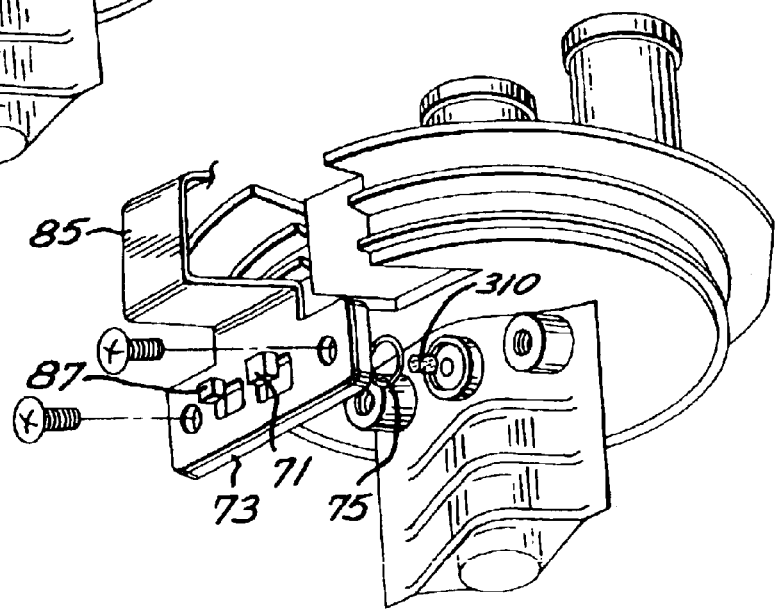
FIG. 16 is an exploded view illustrating the pressure transducer and the chassis member of the ink container of FIGS. 6 and 7, and showing the porous plug of FIG. 13.

In a first embodiment, a mechanism for dampening the high frequency pressure waves comprises a mass of low-stiffness material 300 such as a low-stiffness adhesive deposited over the exterior of the sensor die, as illustrated in FIGS. 12, 13 and 16. The low-stiffness material is flexible enough to allow the pressure sensor die, which forms a pressure sensor diaphragm in this embodiment, to deflect in response to pressure differentials as intended, while dampening deflections in response to high frequency pressure waves. The mass of material improves the shock robustness of the sensor. An exemplary material suitable for the purpose as the low-stiffness material is silicon RTV (room temperature vulcanizing) sealant/adhesive. Tests indicate significant improvement in pressure shock robustness from application of the low-stiffness material 300 covering some or all of the exterior surface of the sensor die 71, with only relatively small reduction in sensitivity of the pressure sensor. The low-stiffness material can also cover some or all of the external surface of the substrate 73 without significant effect on the operation of the pressure sensor. Preferably, the mass 300 is large enough to cover the surface of the sensor die, in this exemplary embodiment at least 2 mm by 2 mm.

In another embodiment of a means for improving the robustness of the pressure sensor to pressure spikes, a porous plug 310 is fitted between the fluid path 1110A leading to the pressure sensor, i.e. between the main body of the fluid and the pressure sensor. In an exemplary embodiment, the plug 310 is a porous metal plug, e.g. a sintered stainless steel plug having a pore size on the order of 10 micrometers, although other pore sizes can alternatively be employed. For example, pore sizes in the range of 0.5 micrometer to 20 micrometers can provide protection against pressure spikes. The plug acts as a low-pass filter and passes gradual changes in pressure to the pressure sensor, but not pressure spikes. In an exemplary embodiment, the plug has respective diameter and length dimensions on the order of 1.3 mm and 2 mm. Other plug embodiments could alternatively be employed, e.g. plugs fabricated of porous ceramic or plastic materials.

Tests of these techniques for improving shock robustness indicate that, for the disclosed exemplary embodiments, both techniques significantly improve the robustness of the pressure sensors to pressure spikes. These tests indicate moderate improvement to shock robustness with little loss of sensor sensitivity for the mass of low-stiffness material 300. The porous pressure dampener 310 virtually eliminated failures due to shock.

Figure 17:
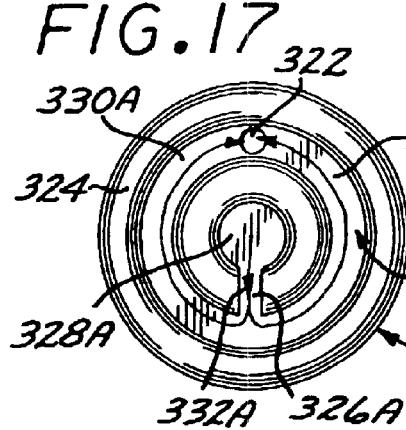
FIG. 17 is a bottom view of an embodiment of a labyrinth o-ring structure as another technique for improving robustness of a pressure sensor to pressure shocks.
Figure 18:
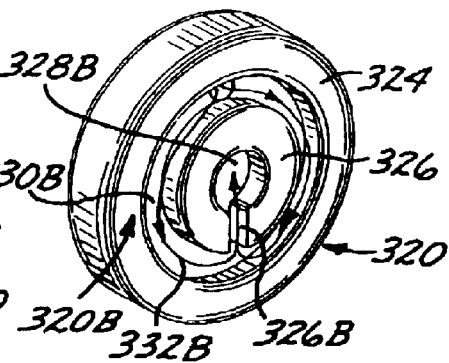
FIG. 18 is an isometric top view of the labyrinth o-ring structure of FIG. 18.
Figure 19:
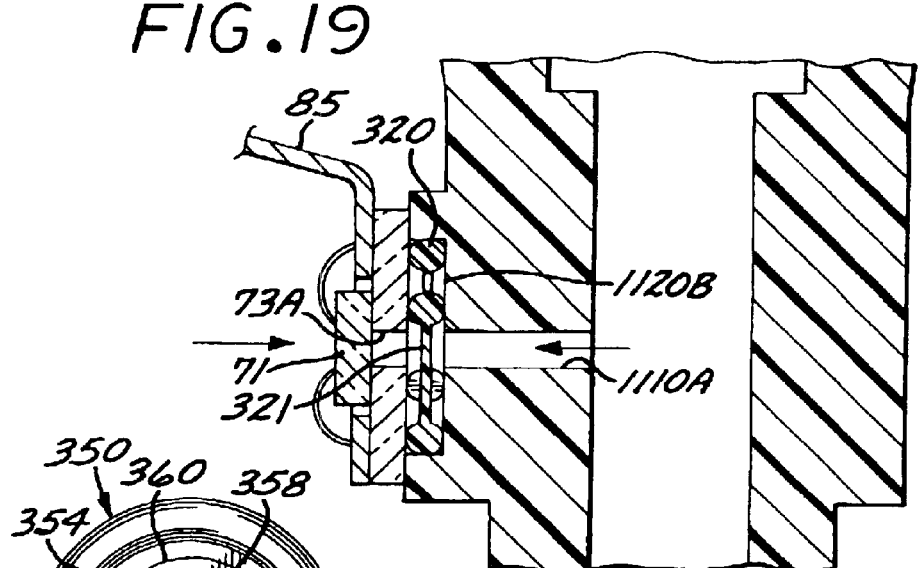
FIG. 19 is a broken-away cross-sectional view of a portion of the ink container of FIG. 10, and showing the labyrinth o-ring structure of FIGS. 17–18 in place.

A third exemplary embodiment of a means for improving the robustness of the pressure sensor to pressure spikes is illustrated in FIGS. 17–20. A labyrinth o-ring gasket structure 320 replaces the o-ring 75 of the embodiment of FIG. 11, between the interior of the outlet port 1110 and the unoccupied portion 1103b of the interior chamber 1103, and is sandwiched in a face seal arrangement between the chassis o-ring gland recess 1120B (FIGS. 19–20) and the sensor substrate 73. Pressure spikes are attenuated by the labyrinth o-ring structure which forms a low-pass filter. The seal structure has symmetrical features on the bottom, reservoir side 320A and front, sensor side 320B (FIGS. 17 and 18).

The structure 320 includes a diaphragm portion 321(FIG. 19) which covers most of the inner diameter of the o-ring structure. An outer circumferential gland 324 extends about the periphery of the o-ring structure. An inner C-shaped gland 326 is spaced between a central surface region 328 and the outer gland 324, and has an opening 326A (reservoir side) and 326B (sensor side) defined in the wall defining the gland. Channels 330A (reservoir side) and 330B (sensor side) are formed between the glands 322, 324. A through hole 322 is formed through the diaphragm portion 321 of the o-ring structure between the outer gland 324 and the inner gland 326, and permits fluid flow between the reservoir side and sensor side of the o-ring.

The labyrinth o-ring structure 320 operates in the following manner. Ink in the chassis passage 1110A entering from the reservoir at the center 328A of the inner gland 326 is forced to flow along flow path 332A through the opening 326A into the channel 330A, around either side of the inner gland to the through hole 322. Ink flowing through the hole 322 from the reservoir side to the sensor side then passes along path 332B in channel 330B to the opening 326B in the inner gland to the center 328B, and then to the center 328B, from which ink flows to the sensor 71. When a pressure impulse occurs, the outer gland 324 provides compliance, and the narrow flow path defined by path portions 332A, 332B and the hole 322 provides dampening. The result is an attenuated pressure spike on the sensor side.

The labyrinth o-ring structure is a unitary part, typically an injection molded structure, fabricated of an elastomeric material. Exemplary materials suitable for the purpose include Butadiene Acrylonitrile (Nitrile) and EPDM. Nitrile elastomers can provide improved barrier properties with respect to air diffusion.

Improved performance of the o-ring structure 320 may be obtained for some applications by employing a relatively thin outer gland 324. This gland assists in shock suppression as a complaint member of the structure; unduly increasing its thickness can substantially reduce its compliance.

Exemplary dimensions of the o-ring structure 320 for a particular application are as follows: outer diameter, 3.6 mm; diaphragm thickness, 0.2 mm; outer gland thickness, 0.4 mm; inner gland thickness, 0.3 mm; through hole diameter, 0.3 mm.

Figure 21:
FIG. 21 is a front view of an alternated embodiment of a labyrinth o-ring structure for improving robustness of a pressure sensor to pressure shocks.
Figure 20:
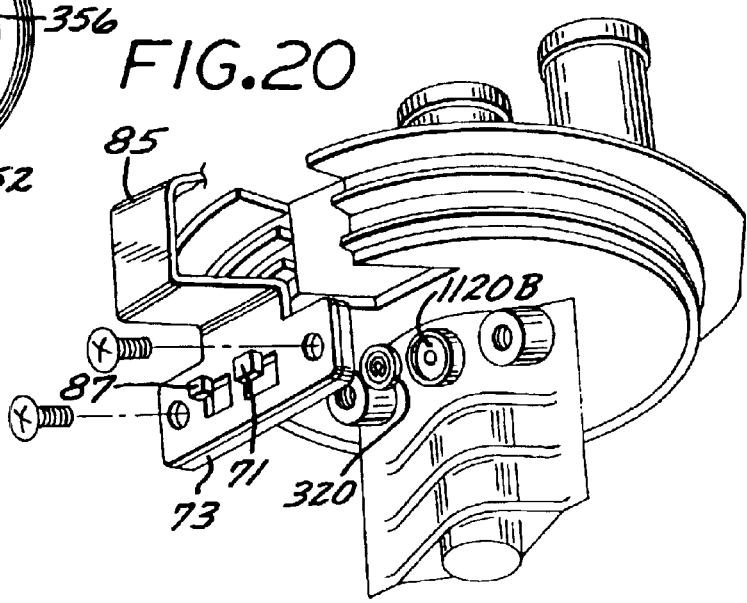
FIG. 20 is an exploded view illustrating the pressure transducer and the chassis member of the ink container of FIGS. 6 and 7, and showing the labyrinth o-ring structure of FIGS. 17–18.

Various modifications can be made to the gasket structure. The structure need not have a circular periphery, for example. Also, instead of providing dual flow paths on each side of the o-ring, a configuration can be employed with a single flow path, with the inner gland having one end which ends at the outer gland. Such an alternate configuration is shown in FIG. 21. Here, the o-ring structure 350 has a through hole 352, an outer gland 354 and an inner gland 356. The inner gland 356 is not completely circular, but instead is hook-shaped, with gland end 356A molded into the outer gland adjacent the through hole 352. The flow path 360 from the center region 358 defines a single path, instead of splitting into two path portions as in the embodiment of FIGS. 17–20. This increases the effective flow path length.

The gasket structure provides a seal function integrated with a pressure shock dampening function, and thus provides the advantage of accomplishing both functions with a single part.

While the foregoing fluid supply implementation applies greater than ambient pressure to the ink supply, the techniques for protecting the sensor against pressure spikes in accordance with the invention can be employed in systems wherein the ink supply is subjected only to ambient or atmospheric pressure instead of a pressure that is greater than atmospheric pressure, for example in a system wherein a non-pressurized ink supply is elevated so that ink flows out of the ink container by gravity. Also, the disclosed techniques can be employed in other printing or marking systems that employ liquid ink such as liquid electrophotographic printing systems.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A fluid containment device, comprising:
   a reservoir structure for holding a supply of fluid;
   a fluid passageway in fluid communication with the reservoir structure and leading to a fluid port;
   a sensor port in fluid communication with the fluid passageway;
   a sensor mounted at the sensor port, the sensor including a substrate and a sensor die mounted on the substrate, the substrate having a surface exposed to fluid in the fluid passageway, the sensor die responsive to fluid pressure differentials to generate an electrical sensor signal; and
   a mechanical filter for protecting the sensor die against sudden fluid pressure spikes.

2. The device of claim 1, wherein said mechanical filter comprises:
   a body of elastomeric material disposed on an external surface of the sensor die.

3. The device of claim 2, wherein the elastomeric material is silicon rubber.

4. A fluid containment device, comprising:
   a reservoir structure for holding a supply of fluid;
   a fluid passageway in fluid communication with the reservoir structure and leading to a fluid port disposed in a sensor fluid passageway;
   a sensor port in fluid communication with the fluid passageway;
   a sensor mounted at the sensor port, the sensor including a substrate and a sensor die mounted on the substrate, the sensor die responsive to fluid pressure differentials to generate an electrical sensor signal; and
   a mechanical filter for protecting the sensor die against sudden fluid pressure spikes, the mechanical filter comprising a porous member disposed in said sensor fluid passageway, said porous member allowing sufficient fluid flow therethrough to pass gradual changes in pressure, but insufficient fluid flow therethrough to allow passage of said sudden fluid pressure spikes, wherein the porous member is a porous metal plug.

5. The device of claim 4, wherein the porous metal plug is a sintered stainless steel plug.

6. A fluid containment device, comprising:
a reservoir structure for holding a supply of fluid;
a fluid passageway in fluid communication with the reservoir structure and leading to a fluid port;
a sensor port in fluid communication with the fluid passageway;
a sensor mounted at the sensor port, the sensor including a substrate and a sensor die mounted on the substrate, the sensor die responsive to fluid pressure differentials to generate en electrical sensor signal; and
a mechanical filter for protecting the sensor die against sudden fluid pressure spikes, wherein said mechanical filter comprises:
a labyrinth seal structure positioned between the sensor and the sensor port, said seal structure including a gland structure for providing a fluid seal, and a labyrinth fluid flow path between a reservoir side of the seal structure and a sensor side of the seal structure.

7. The device of claim 6, wherein the seal structure includes a diaphragm portion, a through hole formed in the diaphragm portion between the reservoir side and the sensor side, and an inner gland portion and an outer gland portion.

8. The device of claim 7, wherein said fluid flow path extends from a center region of said seal structure on said reservoir side, along a first channel extending between said inner and outer gland portions on said reservoir side, through said hole to a second channel between said inner and outer gland portions on said sensor side to a center region of said seal structure on said sensor side.

9. The device of claim 8, wherein said first channel includes a first channel portion and a second channel portion.

10. The device of claim 6, wherein said reservoir side of said seal structure and said sensor side of said seal structure are symmetrical.

11. The device of claim 6, wherein said seal structure is an o-ring structure, fabricated of an elastomeric material.

12. A fluid containment device, comprising:
a reservoir structure for holding a supply of fluid, wherein said reservoir structure includes a flaccid bag;
a fluid passageway in fluid communication with the reservoir structure and leading to a fluid port;
a sensor port in fluid communication with the fluid passageway;
a sensor mounted at the sensor port, the sensor including a substrate and a sensor die mounted on the substrate, the sensor die responsive to fluid pressure differentials to generate an electrical sensor signal; and
a mechanical filter for protecting the sensor die against sudden fluid pressure spikes.

13. The device of claim 12, wherein said reservoir structure further includes a chassis structure having a keel portion for attachment to said bag, and wherein said fluid passageway passes through said chassis structure.

14. The device of claim 13, further comprising a sensor fluid passageway defined in said chassis structure between said fluid passageway and said sensor port.

15. A fluid containment device, comprising:
a pressure vessel;
a reservoir structure disposed within said pressure vessel for holding a supply of fluid, the reservoir structure having a collapsible wall;
an air region within said pressure vessel and outside the reservoir structure for holding air under positive pressure and apply positive pressure on fluid held in the reservoir structure;
a fluid supply passageway in fluid communication with the reservoir structure and leading to a fluid port;
an air passageway in fluid communication with the air region for connection to a source of pressurized air;
a fluid sensor passageway in fluid communication between the fluid supply passageway and a sensor port;
a sensor mounted at the sensor port, the sensor including a substrate and a sensor die mounted on the substrate, the sensor die responsive to fluid pressure differentials to generate an electrical sensor signal; and
a protection structure for protecting the sensor die against sudden pressure spikes.

16. The device of claim 15, wherein said protection structure comprises:
a body of elastomeric material disposed on an external surface of the sensor die.

17. The device of claim 16, wherein the elastomeric material is silicon rubber.

18. The device of claim 15, wherein said reservoir structure includes a flaccid bag.

19. The device of claim 18, wherein said reservoir structure further includes a chassis structure having a keel portion for attachment to said bag, and wherein said fluid passageway passes through said chassis structure.

20. The device of claim 19, further comprising a sensor fluid passageway defined in said chassis structure between said fluid passageway and said sensor port.

21. A fluid containment device, comprising:
a pressure vessel;
a reservoir structure disposed within said pressure vessel for holding a supply of fluid, the reservoir structure having a collapsible wall;
an air region within said pressure vessel and outside the reservoir structure for holding air under positive pressure and apply positive pressure on fluid held in the reservoir structure;
a fluid supply passageway in fluid communication with the reservoir structure and leading to a fluid port disposed in a sensor fluid passageway;
an air passageway in fluid communication with the air region for connection to a source of pressurized air;
a fluid sensor passageway in fluid communication between the fluid supply passageway and a sensor port;
a sensor mounted at the sensor port, the sensor including a substrate and a sensor die mounted on the substrate, the sensor die responsive to fluid pressure differentials to generate an electrical sensor signal; and
a protection structure for protecting the sensor die against sudden pressure spikes, said protection structure comprising a porous member disposed in said sensor fluid passageway, said porous member allowing sufficient fluid flow therethrough to pass gradual changes in pressure, but insufficient fluid flow therethrough to allow passage of said sudden fluid pressure spikes, wherein the porous member is a porous metal plug.

22. The device of claim 21, wherein the porous metal plug is a sintered stainless steel plug.

23. A fluid containment device, comprising:
a pressure vessel;
a reservoir structure disposed within said pressure vessel for holding a supply of fluid, the reservoir structure having a collapsible wall;
an air region within said pressure vessel and outside the reservoir structure for holding air under positive pressure and apply positive pressure on fluid held in the reservoir structure;
a fluid supply passageway in fluid communication with the reservoir structure and leading to a fluid port;
an air passageway in fluid communication with the air region for connection to a source of pressurized air;
a fluid sensor passageway in fluid communication between the fluid supply passageway and a sensor port;
a sensor mounted at the sensor port, the sensor including a substrate and a sensor die mounted on the substrate, the sensor die responsive to fluid pressure differentials to generate an electrical sensor signal; and
a protection structure for protecting the sensor die against sudden pressure spikes, wherein said protection structure comprises:
a labyrinth seal structure positioned between the sensor and the sensor port, said seal structure including a gland structure for providing a fluid seal, and a labyrinth fluid flow path between a reservoir side of the seal structure and a sensor side of the seal structure.

24. The device of claim 23, wherein the seal structure includes a diaphragm portion, a through hole formed in the diaphragm portion between the reservoir side and the sensor side, and an inner gland portion and an outer gland portion.

25. The device of claim 24, wherein said fluid flow path extends from a center region of said seal structure on said reservoir side, along a first channel extending between said inner and outer gland portions on said reservoir side, through said hole to a second channel between said inner and outer gland portions on said sensor side to a center region of said seal structure on said sensor side.

26. The device of claim 25, wherein said first channel includes a first channel portion and a second channel portion.

27. The device of claim 23, wherein said reservoir side of said seal structure and said sensor side of said seal structure are symmetrical.

28. A pressure sensor device, comprising:
a pressure sensitive structure which deflects in response to a pressure differential to provide an electrical sensor signal indicative of said pressure differential, wherein the pressure sensitive structure has a first surface exposed to a first fluid in a fluid passageway and a second surface exposed to a second fluid or gas; and
a protection structure for protecting the pressure sensitive structure against sudden spikes in said pressure differential, said protection structure comprising a body of low-stiffness material disposed on said second surface of the pressure sensitive structure.

29. The device of claim 28, wherein the low-stiffness material is an elastomeric material.

30. The device of claim 28, wherein the pressure sensitive structure includes a thin die.

31. A pressure sensor device, comprising:
a pressure sensitive structure which deflects in response to a pressure differential to provide an electrical sensor signal indicative of said pressure differential; and
a protection structure for protecting the pressure sensitive structure against sudden spikes in said pressure differential, said protection structure comprising a labyrinth seal structure positioned between the sensor and a sensor port, said seal structure including a gland structure for providing a fluid seal, and a labyrinth fluid flow path between a reservoir side of the seal structure and a sensor side of the seal structure.

32. The device of claim 31, wherein the seal structure includes a diaphragm portion, a through hole formed in the diaphragm portion between the reservoir side and the sensor side, and an inner gland portion and an outer gland portion.

33. The device of claim 32, wherein said fluid flow path extends from a center region of said seal structure on said reservoir side, along a first channel extending between said inner and outer gland portions on said reservoir side, through said hole to a second channel between said inner and outer gland portions on said sensor side to a center region of said seal structure on said sensor side.

34. The device of claim 33, wherein said first channel includes a first channel portion and a second channel portion.

35. The device of claim 31, wherein said reservoir side of said seal structure and said sensor side of said seal structure are symmetrical.

36. A pressure sensor device, comprising:
a substrate having opposed first and second surfaces;
a pressure sensitive structure attached to said substrate and responsive to a pressure differential between a first fluid pressure applied to the first surface and a second fluid pressure applied to the second surface to provide an electrical sensor signal indicative of said pressure differential, said pressure sensitive structure comprising a body of low-stiffness material disposed on said second surface the pressure sensitive structure.

37. The device of claim 36, wherein the low-stiffness material is an elastomer material.

38. A pressure sensor device, comprising:
a substrate having opposed first and second surfaces;
a pressure sensitive structure attached to said substrate and responsive to a pressure differential between a first fluid pressure applied to the first surface and a second fluid pressure applied to the second surface to provide an electrical sensor signal indicative of said pressure differential, said protection structure comprising a labyrinth seal structure positioned between the sensor and the sensor port, said seal structure including a gland structure for providing a fluid seal, and a labyrinth fluid flow path between a reservoir side of the seal structure and a sensor side of the seal structure.

39. The device of claim 38, wherein the seal structure includes a diaphragm portion, a through hole formed in the diaphragm portion between the reservoir side and the sensor side, and an inner gland portion and an outer gland portion.

40. The device of claim 39, wherein said fluid flow path extends from a center region of said seal structure on said reservoir side, along a first channel extending between said inner and outer gland portions on said reservoir side, through said hole to a second channel between said inner and outer gland portions on said sensor side to a center region of said seal structure on said sensor side.

41. The device of claim 40, wherein said first channel includes a first channel portion and a second channel portion.

42. The device of claim 38, wherein said reservoir side of said seal structure and said sensor side of said seal structure are symmetrical.

43. A fluid containment device, comprising:

a reservoir structure for holding a supply of fluid;

a sensor port in fluid communication with the reservoir structure; a sensor mounted at the sensor port, the sensor including a substrate and a sensor die mounted on a first surface of the substrate, the substrate having a second surface exposed to the fluid, the sensor die responsive to fluid pressure differentials to generate an electrical sensor signal; and means for protecting the sensor die against sudden fluid pressure spikes.

44. The device of claim 43, wherein said means for protecting the sensor die comprises:

a body of elastomeric material disposed on an external surface of the sensor die.

45. The device of claim 44, wherein the elastomeric material is silicon rubber.

46. A fluid containment device, comprising:

a reservoir structure for holding a supply of fluid;

a sensor port in fluid communication with the reservoir structure and in a sensor fluid passageway;

a sensor mounted at the sensor port, the sensor including a substrate and a sensor die mounted on the substrate, the sensor die responsive to fluid pressure differentials to generate an electrical sensor signal; and means for protecting the sensor die against sudden fluid pressure spikes, said means comprising a porous member disposed in said sensor fluid passageway, said porous member allowing sufficient fluid how therethrough to pass gradual changes in pressure, but insufficient fluid how therethrough to allow passage of said sudden fluid pressure spikes, wherein the porous member is a porous metal plug.

47. The device of claim 46, wherein the porous metal plug is a sintered stainless steel plug.

48. A fluid containment device, comprising:

a reservoir structure for holding a supply of fluid;

a sensor port in fluid communication with the reservoir structure;

a sensor mounted at the sensor port, the sensor including a substrate end a sensor die mounted on the substrate, the sensor die responsive to fluid pressure differentials to generate an electrical sensor signal; and means for protecting the sensor die against sudden fluid pressure spikes, wherein said means for protecting the sensor die comprises:

a labyrinth seal structure positioned between the sensor and the sensor port, said seal structure including a gland structure for providing a fluid seal, and a labyrinth fluid flow path between a reservoir side of the seal structure and a sensor side of the seal structure.

49. The device of claim 48, wherein the seal structure includes a diaphragm portion, a through hole formed in the diaphragm portion between the reservoir side and the sensor side, and an inner gland portion and an outer gland portion.

50. The device of claim 49, wherein said fluid flow path extends from a center region of said seal structure on said reservoir side, along a first channel extending between said inner and outer gland portions on said reservoir side, through said hole to a second channel between said inner and outer gland portions on said sensor side to a center region of said seal structure on said sensor side.

51. The device of claim 50, wherein said first channel includes a first channel portion and a second channel portion.

52. The device of claim 48, wherein said reservoir side of said seal structure and said sensor side of said seal structure are symmetrical.

53. The device of claim 48, wherein said seal structure is an o-ring structure, fabricated of an elastomeric material.

54. A fluid containment device, comprising:

a reservoir structure for holding a supply of fluid, wherein said reservoir structure includes a flaccid bag;

a sensor port in fluid communication with the reservoir structure;

a sensor mounted at the sensor port, the sensor including a substrate and a sensor die mounted on the substrate, the sensor die responsive to fluid pressure differentials to generate an electrical sensor signal; and means for protecting the sensor die against sudden fluid pressure spikes.

55. The device of claim 54, wherein said reservoir structure further includes a chassis structure having a keel portion for attachment to said bag, and wherein said fluid passageway passes through said chassis structure.

56. The device of claim 55, further comprising a sensor fluid passageway defined in said chassis structure between said fluid passageway and said sensor port.

* * * * *

UNITED STATES PATENT AND TRADEMARK OFFICE
CERTIFICATE OF CORRECTION

PATENT NO. : 6,886,929 B2  Page 1 of 1
APPLICATION NO. : 10/280441
DATED : May 3, 2005
INVENTOR(S) : Malik et al.

It is certified that error appears in the above-identified patent and that said Letters Patent is hereby corrected as shown below:

Col. 13 (line 31), delete "how" and insert therefor --flow--.

Col. 13 (line 33), delete "how" and insert therefor --flow--.

Signed and Sealed this

Fifth Day of September, 2006

JON W. DUDAS
*Director of the United States Patent and Trademark Office*